ary, be on the order of several years at least, the coating being capable during such time of remaining free of cracking, crazing, checking, peeling and other like defects which would expose the underlying inflammable material, or prevent attractive redecoration of the surface.

United States Patent Office 2,722,523
Patented Nov. 1, 1955

2,722,523
INTUMESCENT COATING COMPOSITION, AND BINDER AND PROCESS THEREFOR

Allan E. Gilchrist, Cleveland, Laurence D. Harrup, Lakewood, Robert C. Hendrickson, Cleveland, and Donald T. Rehor, Lynhurst, Ohio, assignors to The Glidden Company, Cleveland, Ohio, a corporation of Ohio No Drawing. Application September 13, 1952, Serial No. 311,324

17 Claims. (Cl. 260—17.3)

This invention relates to an intumescent coating composition particularly adapted for application as a fire-retardant coating on inflammable building materials such as wood, vegetal fibre board, acoustic tile and the like, or for application to any surface where thermal insulation against fire or high heat is desired.

Various porous, interior, building, acoustic and decorative materials fabricated from vegetal fibres, such as acoustic tiles, wall board, wall planking, and the like, are rather inflammable and are desirably protected by applying thereto an intumescent fire-retardant coating of the type which puffs up when exposed to flame or high heat so as to form a thick heat-insulating layer of ash between the flame or heat and the inflammable building material. The use of such intumescent coatings on porous building materials of the kinds mentioned poses numerous problems. Of primary importance is a coating which will at least meet the standard fire tests for "Slow-Burning Materials" such as set forth in Federal specification SSA–118A. It is also important to provide a coating which is capable of being applied to such porous materials so as to form a true surface-coating thereon. Coatings which will not bridge the pores, or which sink into the body of the building material provide neither the desired fire-retarding characteristics, nor the desired surface layer. For practical commercial use, the coating is applied not only to overcome the inflammability of the building material, but also to serve as a decorative base or finish coat. The coatings should therefore be light in color and capable of being pigmented to give desired color appeal, and should also be capable of being redecorated from time to time. They should also withstand washing treatment of the type appropriate to washable wall paper, and washable interior wall paints. Moreover, the cost of such intumescent coatings must be moderate, and their service life should be on the order of several years at least, the coating being capable during such time of remaining free of cracking, crazing, checking, peeling and other like defects which would expose the underlying inflammable material, or prevent attractive redecoration of the surface.

We have now found that a coating meeting all of the requirements mentioned above can be provided by using a heat-curable, modified, urea-aldehyde-type reaction product as a binder therefor. The composition usually includes such further components as starch, pigments, fillers and suitable curring catalyst(s) for the binder.

Reaction products of the urea-formaldehyde type have been used in prior intumescent coatings but to the best of our knowledge those coatings have lacked sufficient flexibility and washability to meet present demands or desires since it has been generally necessary in the past to sacrifice water-insolubility and washability in favor of flexibility and also to sacrifice washability in favor of good intumescent qualities. We have now discovered that water-soluble heat-curable resins of the type fully described hereinafter afford light-colored coatings having good washability, flexibility and intumescent qualities.

Accordingly, it is an object of this invention to provide a low-cost, serviceable, intumescent coating composition comprising particular water-soluble, heat-curable binders of the modified urea-aldehyde type.

It is a further object to provide clear light-colored intumescent coatings which have satisfactory fire-retardant, intumescent qualities, which can be washed without impairing the fire-retardant intumescent qualities, and which can, if desired, be pigmented.

It is still a further object to provide an intumescent coating which can be applied to porous, vegetal-fibre and like building materials to provide a true surface coat thereon capable of meeting the standards of performance established for "slow-burning materials," and capable of serving additionally as a washable, decorative base or finish coat.

Yet another object is to provide novel water-soluble, light-colored, heat-curable resins of the modified urea-aldehyde type.

These and other objects will be apparent from the description of the invention and from the examples contained hereinafter.

We have now found that clear or pigmented intumescent coatings having adequate flexibility and good washing qualities can be prepared from water-soluble, heat-curable resins of the modified urea-aldehyde type. While nitrogenous materials other than urea can be used in preparing the resins, for convenience we call such resins hereinabove and hereinafter by the name "resins of the urea-aldehyde type" except when more specific designations are used to identify various species of the broad class.

The improved properties of our resinous binder and of the resulting coatings are due in part to the use of polyhydric alcohols, in part to the use of amides of carboxylic acids along with urea and comparable carbamides, and in part to the processing treatment employed in reacting the various ingredients of the binder. The following examples illustrate the novel features which are hereinafter described more fully.

EXAMPLE I

A water-soluble, heat-curable resinous binder was prepared from the following ingredients:

| | | |
|---|---|---|
| Formaldehyde (in the form of a 37% solution) | moles | 7.4 |
| Sorbitol (dry) | do | 1.1 |
| Urea | do | 2.6 |
| Formamide | do | 1.75 |
| Phosphoric acid (2.12 Normal) | ml | 15 |
| Sodium hydroxide | ml | 8 |

One-third of the aqueous solution of formaldehyde was introduced into a flask, and all of the sorbitol was added to it. The whole mass was then heated to reflux temperature for one hour, after which time the contents of the flask was cooled to about 70° F. and the pH was adjusted by adding the sodium hydroxide. The quantity (8 ml.) of sodium hydroxide had been selected in advance so that a pH of about 8 would exist in the contents of the flask just after all of the remaining ingredients, above (except phosphoric acid), had been added. The formamide was mixed with the remaining two-thirds of the formaldehyde, and the resulting mixture was added to the flask. The urea was then added to the mass in the flask and the entire contents was heated at reflux for one hour, after which time the contents had a pH of around 5.5. The phosphoric acid was then added and the contents of the flask was heated to distill off water. Distillation was continued until the contents of the flask, upon neutralization with sodium hydroxide to a pH of 7 to 8, had a theoretical solids content of about 60%. The flask and neutralized contents were then allowed to cool. The resinous product so prepared had a viscosity of around Z₂ (Gardner-Holdt) and was a clear, water-soluble liquid of good chemical stability (shelf life) at room temperatures, and capable of being cured by further heating at elevated temperatures.

An intumescent coating suitable for application by spraying to a vegetable-fibre board was prepared as follows:

|  | Grams |
|---|---|
| Above resin at 60% solids | 134 |
| Dry starch | 80 |
| Lithopone | 54 |
| Mica | 17 |
| Asbestine | 9 |
| Dowicide A (preservative) | 1.1 |
| Water | 50 | plus

| Guanylurea phosphate | 43 |
|---|---|
| Water | 42 |

The starch was mixed into the resin by stirring, after which the lithopone, asbestine, mica, water (50 g.) and Dowicide A were added. The whole mixture was then milled until uniformly blended. The water (42 g.) and guanylurea phosphate were combined and then were added to thin the blended product to spraying viscosity. Panels of vegetable-fibre board were then sprayed with the resulting coating, and were baked for 5 minutes at 300° F. The baked panels had a continuous surface coat thereon and were capable of being punched, drilled or otherwise milled to improve their acoustic properties without causing cracking of the coating. Moreover, the coatings exhibited good washability and were satisfactory in intumescent qualities as determined by standard tests applied to "slow-burning materials," supra.

EXAMPLE 2

A water-soluble, heat-curable resinous product was prepared from:

| Formaldehyde (in form of 37% aqueous solution) | moles | 7.4 |
|---|---|---|
| Sorbitol | do | 1.1 |
| Urea | do | 1.7 |
| Oxamide | do | 1.8 |
| Sodium hydroxide (1.48 Normal) | ml | 8 |
| Phosphoric acid (2.12 Normal) | ml | 15 |

One-third of the formaldehyde was refluxed with all of the sorbitol as in Example I after which the sodium hydroxide was added to adjust the pH and the whole mass cooled to room temperature. A mixture of the urea and oxamide was prepared and added to the cool mass. Some heat was liberated, and the mixed mass was cloudy. The cloudy mass was refluxed until it became clear and was refluxed for an additional hour thereafter. Thereupon the phosphoric acid was added, after which, as in Example I, water was distilled off until the remaining mass upon neutralization with sodium hydroxide to pH about 7–8 had a theoretical solids content of about 60%. After neutralization, the resulting product had a viscosity of about Z₄ (Gardner-Holdt).

This resinous product was used to replace the resinous product of Example I in the coating there described. After being sprayed on panels and cured by heating 5 minutes at 300° F., the coating was found to be washable, adequately flexible, and satisfactory in intumescence.

*The resinous binder*

From the foregoing examples it will be evident that sorbitol is chemically integrated with the other ingredients of the resin. The presence of the sorbitol of the examples is essential to the development of intumescence, and is to the best of our knowledge also responsible in some measure for the improved flexibility of the cured binder. In tests we have carried out in an effort to determine the relationship between intumescent qualities and the sorbitol content of the resin, we found that when the sorbitol was reduced to 0.5 mol in the foregoing examples without other changes therein, the intumescent qualities became unsatisfactory in that the coatings failed to pass the standard fire tests. While we also found that the sorbitol content can be increased greatly over the 1.1 mols of the examples without impairing intumescence, when the molar ratio of sorbitol to total molar quantity of nitrogenous compounds (urea plus formamide or urea plus oxamide) exceeded about 3:3.5, then the cured resins became too water-sensitive and no longer possessed satisfactory retention of washability on aging. Thus the sorbitol content of the examples is limited at one extreme by development of unsatisfactory intumescent qualities in the coating and at the other extreme by unsatisfactory washability. These attributes of sorbitol are characteristic of other aliphatic polyhydric alcohols which can be used in place of sorbitol, e. g. mannitol, glycerine, pentaerythritol, sucrose, and glycols such as ethylene glycol, di-, tri-, tetra- and higher ethylene glycols, propylene glycols, butylene glycol, etc. We have found that the suitable polyhydric alcohols are those in which there are not more than 2 carbons per oxygen atom. Dextrose gives rather poor intumescence by itself but can be used in combination with other polyhydric alcohols.

The quantity of aldehyde used in the resins of the foregoing examples is chemically related also to the total quantity of nitrogenous material. On a strict stoichiometric basis, the urea + formamide of Example I or the urea + oxamide of Example 2 would require about 7 mols of formaldehyde for reaction therewith to form their methylol derivatives. Actually, however, the molar ratio of formaldehyde to total nitrogenous material in Example 2 is about 2.2 to 1, thereby providing a 10% excess over the theoretical stoichiometric ratio. The molar ratio of aldehyde(s) to nitrogenous material can be varied appreciably, but should be at least 1 to 1. Ratios above 3 to 1 can be used without harm, but are not commercially practical. The same ratios apply also where other aldehydes such as acetaldehyde are used alone or in combination with formaldehyde. Of course, paraformaldehyde can be used in place of formaldehyde or in admixture with formaldehyde and/or acetaldehyde, but aqueous formaldehyde solutions are preferred for easy handling.

Example I illustrates the use of an amide of a lower monocarboxylic acid. Other amides of monobasic acids having up to 18 carbons can be used, e. g. amides derived from such acids as acetic, lactic, butyric, linoleic, linolenic, etc. However, we prefer amides derived from monocarboxylic acids having up to 8 carbons. Example 2 illustrates the use of an amide of a lower dicarboxylic acid. Di-amides of other dicarboxylic acids having from 2 through 36 carbons can be used, e. g. amides derived from acids such as malic, sebacic, adipic, glutaric, azelaic, and dimer fatty acids. We prefer diamides derived from dicarboxylic acids having between 2 and 10 carbons. Mixtures of mono- and di-amides can also be used.

The ratio of urea to total amides may be varied rather extensively, and urea can be wholly omitted if desired. However, the amides on one hand give less intumescence than urea, so that we prefer to always use some urea in our compositions. On the other hand, the amides tend to improve the flexibility of the resins and to decrease water-solubility. Accordingly, the ratio of urea to amides can be adjusted as desired to adjust intumescent qualities, flexibility and water solubility. We prefer to have the molar ratio of urea to total amides between about 5:1 and 1:2.

In the preparation of the resinous binder as described in the foregoing examples, there is no particular significance in refluxing the sorbitol with one-third of the formaldehyde. Since the sorbitol is in a solid state, it is first dissolved completely in a part of the aqueous formaldehyde. When aqueous sorbitol solutions are used instead of the solid sorbitol, then the dissolution step is of course unnecessary. When paraformaldehyde is used, then again a preliminary dissolution step is desirable, in this case involving dissolving the paraformaldehyde in the sorbitol solution. When paraformaldehyde and dry sorbitol are used, then enough water should be used to effect their dissolution. After the polyhydric alcohol(s) and selected aldehyde(s) have been completely dissolved in any desired quantity of water at least sufficient for that purpose, the resulting solution is next brought to an alkaline pH with any desired base, e. g. alkali or alkali-earth oxides, hydroxides, or carbonates, organic amines, quaternary ammonium bases, etc. Commercial caustic soda is preferred. An alkaline pH is desired, as well known, to promote the formation of methylol derivatives of the urea and/or amides. After condensation has been effected in alkaline conditions, resinification is effected under acidic conditions while water is distilled off. In Example I, the formamide hydrolyzes slightly during the condensation treatment to ultimately establish an acid pH. If the acidity so produced is not within the range of pH 4.5 to 5.0, then any organic or inorganic acid, preferably phosphoric, can be added to establish the desired pH. The oxamide of Example 2 does not hydrolyze appreciably like the formamide of Example I, so added acid is necessary in Example 2 to establish the desired acid pH. As indicated in the examples, resinification under acidic conditions is carried on with elimination of water until the solids content reaches about 60%. This is a solids content that is convenient for use in preparing the coatings, but in the examples also happens to coincide with the desired extent of resinification. Extent of resinification is an important feature of our resin preparation and is discussed more fully hereinafter. Neutralization after distillation stops further resinification and can be effected with any desired alkali or alkali-earth base. Ammonia or ammonium hydroxide induces discoloration, so for that reason should be avoided.

As pointed out earlier in this specification, one of our objectives is to provide a washable intumescent coating composition. We have found experimentally that resins prepared from the classes of ingredients set out hereinabove are capable of yielding such washable coatings, and we have found that the attainment of washability is directly dependent on the extent of resinification which is secured in preparing the resinous binder thereof. We have also found that resinification beyond that just necessary to give adequate washability should be avoided in order to retain maximum shelf life. While we have sought some convenient test to show when the proper amount of resinification has been secured, we have learned by experience that such factors as specific gravity, solids content, and ultra-violet absorption spectra are all without significance. To the best of our present knowledge, the most reliable way of determining the resinification end-point is to take out a sample of the resinous mass at intervals, prepare coatings from each sample in accordance with the coating formulations of Examples 1 or 2, spray and cure such coatings for 5 minutes at 300° F. and then test the cured coatings for washability by any convenient or standard washing test. Such test, however, is inconvenient except for ultimate control purposes, and we have found that Gardner-Holdt viscosity measurements provide a more convenient but less significant test for extent of resinification. We have found that a viscosity of $Z_2$ to $Z_4$ is generally suitable when measured in the neutralized product at 60% solids, but certain combinations of reactants may give good washability at viscosities as low as $Z_1$ or as high as $Z_5$. For instance, the resinification and distillation of Example I can be stopped when the neutralized mass at 60% solids has a viscosity between $Z_1$ and $Z_3$, while that of Example 2 can be stopped when the viscosity of the neutralized mass at 60% solids is between $Z_3$ and $Z_5$. As indicated above, we prefer to attain a viscosity of $Z_2$ to $Z_4$.

*Formulating the coatings*

When preparing coatings from the water-soluble resins described hereinabove, it is desirable (but not necessary) to introduce starch in an essentially unswelled condition, and to retain the starch in that form. The starch imparts no adhesive properties to the composition and functions essentially as a pigment and as a "non-resinous carbonific" (U. S. Patent 2,523,626). It is readily carbonized when the coating is ultimately contacted with flame and hence supplies carbon and gases in situ at the time when intumescence occurs. It thus helps to impart solids and puffing, and thereby assists in producing the desired heat-insulating layer of ash. The amount of starch can be varied widely in its proportions to the resin or can be omitted entirely, but too much can impair the intumescence. We prefer to use starch or other comparable, non-resinous carbonific materials (e. g. dextrin, carbohydrate gums, modified starches, and carbohydrates and porteins generally) in amounts between about 50% and 150% by weight on the resin solids. Other pigments and/or fillers can be used additionally in about the same quantities; or omitted where the clear to hazy starch-containing coating compositions are desired for non-hiding intumescent purposes. However, since the mineral matter introduced in the form of pigments, fillers, etc. adds ash structure to the intumesced layer, we prefer to include such mineral matter in the amounts stated, in addition to the specified amounts of non-resinous carbonifics. Any conventional organic or inorganic pigments, fillers or extenders can be used to impart desired color to the coatings.

Any suitable preservative or fungicide whose effectiveness is not materially reduced by contact with temperatures such as are used in curing the coatings can be used.

As indicated above, the guanylurea phosphate serves as an acid catalyst for curing the coating. However, it also is an effective intumescent or "spumific" material and hence assists the development of a thick, heat-insulating intumesced layer. Guanylurea sulfate causes discoloration, but otherwise can be used. Other acid curing catalysts such as mono- or di-ammonium phosphate can be used, but they likewise promote yellowing of white coatings, and hence for light coatings are less desirable than guanylurea phosphate. Moreover, guanylurea phosphate is less water-soluble than the ammonium phosphates, thereby rendering the cured coating less water-sensitive. For the combined functions of curing catalyst, intumescence assistance and color retention, guanylurea phosphate is preferred and is desirably present in an amount corresponding to between about 25% and about 100% by weight on the resin solids. We prefer an amount corresponding to about 50%. As indicated above, the guanylurea phosphate can be replaced entirely with or used in admixture with other known acid spumific materials, e. g. monoammonium phosphate, diammonium phosphate, phosphoric acid, ammonium sulfate, sulfamic acid, ammonium sulfamate, ammonium bromide, sodium tungstate, sodium borate and boric acid.

Water can be added to the coatings in desired amounts to secure viscosity adjustments as demanded by the selected method of application. While spray application is desirable for the preparation of coated vegetal-fibre products, other methods such as brushing, dipping, roll coating, knifing, etc. can be used for coating those and other products.

The coatings, whether clear or pigmented, are desirably secured by baking at temperatures around 300° F. Three to eight minutes are generally adequate at this temperature, but longer curing times can be used. When lower temperatures are used, longer time is needed; and when higher temperatures up to 500° F. or above are used, the curing time can be shortened.

Having described our invention, what we claim is:

1. The method of preparing a heat-curable, water-soluble, resinous binder, which comprises: providing a clear aqueous solution of polyhydric alcohol and aldehyde, said polyhydric alcohol being selected from the group consisting of sorbitol, mannitol, glycerine, pentaerythritol, sucrose, ethylene glycol, diethylene glycol, triethylene glycol, tetraethylene glycol, propylene glycol, and butylene glycol, said aldehyde being selected from the group consisting of formaldehyde, acetaldehyde, paraformaldehyde and mixtures thereof, and said polyhydric alcohol and said aldehyde being proportioned therein to provide between ½ and 3 mols of alcohol per 3.5 moles of acidamide material as defined hereinbelow and to provide at least 1 mol of aldehyde per amide group mol of said acidamide material; adding base material to said solution in sufficient quantity to establish a pH of about 8 in the mass just after the acidamide material defined hereinbelow has been added; then adding acidamide material selected from the group consisting of urea, monoamides derived from monocarboxylic fatty acids having up to 18 carbons, monoamides derived from monocarboxylic hydroxy-fatty acids having up to 18 carbons, diamides derived from dicarboxylic fatty acids having from 2 to 36 carbons inclusive, diamides derived from dicarboxylic hydroxy-fatty acids having from 2 to 36 carbons inclusive, and mixtures of the foregoing materials; refluxing the resulting mass until condensation of said aldehyde with said acidamide material has been effected substantially completely; acidifying the refluxed mass to establish therein a pH between 4.5 and 5.0, then distilling water from the acidified mass until the distilland has a theoretical solids content of at least 60% and until a sample of the distilland, when tested at a theoretical solids content of 60%, has a viscosity between about $Z_2$ and $Z_4$ (Gardner-Holdt), then discontinuing the distillation and promptly neutralizing the distilland with sufficient inorganic base selected from the group consisting of alkali metal base and alkali-earth metal base to establish a pH between 7 and 8 when the neutralized distilland has a theoretical solids content of 60%, and finally cooling the neutralized mass.

2. The method as claimed in claim 1 wherein the polyhydric alcohol is sorbitol, wherein the aldehyde is formaldehyde; and wherein the acidamide material is a mixture of urea with at least one of said amides, the ratio of urea to derived amide in said mixture being between 5:1 and 1:2; and wherein the molar ratio of formaldehyde to total $NH_2$ groups of said acidamide material is about 1.1 to 1.

3. The method as claimed in claim 2, wherein the molar ratio of sorbitol to total acidamide material is about 1.1 to 3.5.

4. The method as claimed in claim 2, wherein the acidamide material consists of a mixture of urea with a diamide derived from fatty dicarboxylic acid of 2 to 10 carbons.

5. The method as claimed in claim 4, wherein the molar ratio of urea to diamide is about 1:1, wherein the molar ratio of sorbitol to total acidamide material is about 1.1 to 3.5; and wherein the distillation of water is carried to a distilland viscosity of about $Z_4$ when measured in the manner recited in claim 1.

6. The method as claimed in claim 1, wherein the molar ratio of aldehyde to total $NH_2$ groups of said acidamide material is between about 1:1 and 3:1.

7. The method as claimed in claim 1, wherein the monoamides are derived from monocarboxylic fatty acids of 1 to 8 carbons.

8. The method as claimed in claim 1, wherein the diamides are derived from dicarboxylic fatty acids of 2 to 10 carbons.

9. An intumescent coating composition capable of being cured by heating to yield a washable, durable intumescent coating, said composition comprising the neutralized resinous product prepared in accordance with claim 1, an acidic spumific material in an amount between about 25% and 100% by weight on the solids in said resinous product, and water in sufficient amount to permit said composition to be applied to a desired surface as a continuous coating thereon.

10. An intumescent coating composition as claimed in claim 9, which includes pigment and fillers in a total amount between about 50% and 150% by weight on the solids of said resinous product, and which includes non-resinous carbonific material in an amount between about 50% and 150% by weight on the solids of said resinous product.

11. An intumescent coating as claimed in claim 10, wherein the non-resinous carbonific material is starch in an essentially unswelled state, and wherein the acidic spumific material is guanylurea phosphate in an amount corresponding to about 50% by weight of the solids in said resinous product.

12. An intumescent coating composition capable of being cured by heating to yield a washable, durable intumescent coating, said composition comprising the neutralized resinous product prepared in accordance with claim 4, an acidic spumific material in an amount between about 25% and 100% by weight on the solids in said resinous product, and water in sufficient amount to permit said composition to be applied to a desired surface as a coating thereon.

13. An intumescent coating composition as claimed in claim 12 which includes pigment and fillers in a total amount between about 50% and 150% by weight on the solids of said resinous product, and which includes non-resinous carbonific material in an amount between about 50% and 150% by weight on the solids of said resinous product.

14. An intumescent coating as claimed in claim 13, wherein the non-resinous carbonific material is starch in an essentially unswelled state, and wherein the acidic spumific material is guanylurea phosphate in an amount corresponding to about 50% by weight of the solids in said resinous product.

15. An intumescent coating composition capable of being cured by heating to yield a washable, durable intumescent coating, said composition comprising the neutralized resinous product prepared in accordance with claim 5, an acidic spumific material in an amount between about 25% and 100% by weight on the solids in said resinous product, and water in sufficient amount to permit said composition to be applied to a desired surface as a coating thereon.

16. An intumescent coating composition as claimed in claim 15, which includes pigment and fillers in a total amount between about 50% and 150% by weight on the solids of said resinous product, and which includes non-resinous carbonific material in an amount between about 50% and 150% by weight on the solids of said resinous product.

17. An intumescent coating as claimed in claim 16, wherein the non-resinous carbonific material is strach in an essentially unswelled state, and wherein the acidic spumific material is guanylurea phosphate in an amount corresponding to about 50% by weight of the solids in said resinous product.

References Cited in the file of this patent

UNITED STATES PATENTS

| | | |
|---|---|---|
| 2,168,477 | Hodgins | Aug. 8, 1939 |
| 2,452,054 | Jones | Oct 26, 1948 |